(12) United States Patent
Suzuki et al.

(10) Patent No.: US 6,760,011 B2
(45) Date of Patent: Jul. 6, 2004

(54) KEYBOARD APPARATUS

(75) Inventors: Kazuya Suzuki, Fujisawa (JP);
Toshikazu Saito, Yokohama (JP);
Takuya Yamauchi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 212 days.

(21) Appl. No.: 09/866,265

(22) Filed: May 25, 2001

(65) Prior Publication Data

US 2001/0048427 A1 Dec. 6, 2001

(30) Foreign Application Priority Data

May 26, 2000 (JP) .......................................... 2000-157030

(51) Int. Cl.[7] .............................. G09G 5/08; G09G 5/00; H04N 7/18; G06F 3/00

(52) U.S. Cl. ........................ 345/168; 345/161; 348/143; 348/153; 348/159; 708/135; 708/142

(58) Field of Search ...................... 463/37, 38; 345/168, 345/161; 348/143, 153, 159; 708/135, 142; 235/382, 454

(56) References Cited

U.S. PATENT DOCUMENTS

| | | | | |
|---|---|---|---|---|
| 4,949,080 A | * | 8/1990 | Mikan | 345/161 |
| 5,517,236 A | * | 5/1996 | Sergeant et al. | 348/143 |
| 5,551,701 A | * | 9/1996 | Bouton et al. | 463/36 |
| 5,558,329 A | * | 9/1996 | Liu | 345/161 |
| 5,801,770 A | * | 9/1998 | Paff et al. | 348/211 |
| 5,838,368 A | * | 11/1998 | Masunaga et al. | 348/143 |
| 5,898,425 A | * | 4/1999 | Sekine | 345/168 |
| 6,071,194 A | * | 6/2000 | Sanderson et al. | 463/37 |
| 6,184,862 B1 | * | 2/2001 | Leiper | 345/156 |
| 2001/0048426 A1 | * | 12/2001 | Suzuki et al. | 345/168 |

* cited by examiner

Primary Examiner—Bipin Shalwala
Assistant Examiner—David L. Lewis
(74) Attorney, Agent, or Firm—Pearne & Gordon LLP

(57) ABSTRACT

Herein disclosed is a keyboard apparatus which comprises a joystick, a switch mounted on the joystick, a scan board operative to input a switch signal of the switch-on action of the switch, a memory for memorizing a key code relevant to the switch, a plurality of numerical keys each having a key code inputted therein and outputting a key code signal indicative of the key-pushed actions of the numerical keys, a CPU having the switch signal and the key code signal inputted therein, and state setting means for selectively setting two operation states respectively having the switch signal and the key code signal outputted from the CPU.

7 Claims, 9 Drawing Sheets

KEYBOARD APPARATUS

BACKGROUND OF THE INVENTION

1. Field of the Invention

The present invention relates to a keyboard apparatus available for a surveillance system, and more particularly to a keyboard apparatus equipped with a joystick of the type having a switch mounted thereon.

2. Description of the Related Art

Up until now, there have been proposed a wide variety of conventional keyboard apparatuses equipped with a joystick of the type having a switch mounted thereon.

The conventional keyboard apparatuses of this type have so far been used for such a surveillance system available for watching unqualified people and other intruders intruding into a special room which does not permit people with any permission from entering. One typical example of the conventional keyboard apparatuses is shown in FIG. 8 as being provided in combination with a prior-art surveillance system 700 which comprises a camera unit 710, a display unit 730 for displaying an image taken by the camera unit 710, and a control unit 740 for controlling the operation of the camera unit 710 in response to operation commands inputted therein.

Description will now be made on how the image taken by the camera unit 710 is displayed on the screen of the display unit 730.

When the camera unit 710 is operated to take an image to be displayed on the screen of the display unit 730, the camera unit 710 is firstly driven by the control unit 740 to transform the image into an image signal outputted to a signal transmitting cable 701. The image signal thus outputted to the signal transmitting cable 701 is then transmitted to a system unit 720 before being inputted to the display unit 730.

The image signal is then transformed into an image to be displayed on the screen of the display unit 730.

In order to have the camera unit 710 operated by the operation commands of the control unit 740 to photograph an image, the control unit 740 is operated to receive the operation commands respectively indicative of the photographing directions, magnifications and the like inputted by an operator while he or she is watching the screen of the display unit 730. The control unit 740 inputted with the operation commands is then operated to transform the operation commands into a command signal to be transmitted to a signal transmitting cable 703. The command signal thus transmitted to the signal transmitting cable 703 is then inputted to the system unit 720 where the command signal is then transformed into a drive signal to drive the camera unit 710 to be outputted to the camera unit 710 by way of the signal transmitting cable 701. The camera unit 710 thus received the drive signal from the system unit 720 is at this time operated to change the photographing directions, magnifications and the like into new ones.

As will be seen from the above, there has been described only one camera unit 710 provided in combination with the system unit 720, the display unit 730, the control unit 740 in the conventional surveillance system for the purpose of simplifying the description and assisting in understanding about the whole operation of the surveillance system.

In reality, such a conventional surveillance system 800, however, is as shown in FIG. 9 to comprise a plurality of camera units 810, a system unit 820, a plurality of display units 830, and a plurality of control units 840. The conventional surveillance system 800 thus constructed allows an operator to selectively operate those control units 840 to input to control units 840 operation commands indicative of selecting one or more camera units 810 and one or more display units 830. This leads to the fact that the operator can select one or more control units 840 not only to have the image displayed on the screen of one or more display units 830 in accordance with the image taken by one or more selected camera units 810 but to operate the camera units 810 under the operation states optioned by the operator.

Here, as the control unit 840 forming part of the conventional surveillance system is used a CCTV (Closed Circuit Television) type of keyboard apparatus which is hereinafter referred simply to "a keyboard apparatus". The keyboard apparatus used heretofore is generally equipped with a joystick designed to input operation commands by an operator to ensure that a camera unit is operated under various operation states changed in photographing directions, magnifications and the like. Such a joystick usually has a switch to input the operation commands for example having lenses automatically focus an image.

The foregoing construction of the joystick and switch combination thus far proposed has prompted researchers to develop an easy-to-operate keyboard apparatus, for example, a keyboard apparatus capable of operating the joystick and the switch by one hand.

However, the conventional keyboard apparatus encounters such a problem that the change of the content of the operation commands to the joystick and the switch is performed by a software frequently changed with its new version, resulting from the fact that the content of the operation commands to be inputted by the joystick and the switch by some operators is different from those by other operators.

The conventional keyboard apparatus can change the contents of the operation commands depending upon the needs by the operators, however, encounters complicated management to various kinds of software to be changed in compliance with the needs by the operators. In this sense, the conventional keyboard apparatus is in no practical use.

SUMMARY OF THE INVENTION

It is, therefore, an object of the present invention to provide a keyboard apparatus which facilitates to change the contents of the operation commands depending upon the needs by the operators to allow the operator to readily operate a joystick and a switch operatively mounted thereon.

According to one aspect of the present invention, there is provided a keyboard apparatus for controlling and operating at least one exterior appliance, comprising: a key retainer; a plurality of keys each operatively arranged on the key retainer to perform a key-pushed action and a key-released action, each of the keys being operative to input a signal indicative of the key-pushed action; a joystick journally provided in association with the keys to input a signal indicative of the movement thereof; a switch operatively supported on the joystick and movable with respect to the joystick to selectively perform a switch-on action and a switch-off action; switch signal inputting means for inputting a switch signal indicative of the switch-on action when the switch is operated and moved to perform the switch-on action with respect to the joystick; key code signal inputting means for inputting a key code signal indicative of the key-pushed action when each of the keys is operated and moved to perform the key-pushed action; information recording means for recording specific relevant information between the switch signal inputted from the switch signal inputting means and the key code signal inputted from the key code signal inputting means, the specific relevant information being formed by at least one specific key selected from among the keys and brought into the key-pushed action; signal processing means for receiving and processing the switch signal from the switch signal inputting means and the key code signal from the key code signal inputting means, the signal processing means being operative to selectively assume two different operation states consisting of a first operation state under which the specific relevant information is recorded by the information recording means in accordance with the switch signal inputted by the switch signal inputting means and the key code signal inputted by the key code signal inputting means, and a second operation state under which the key code signal in response to the switch signal from the switch signal inputting means is outputted to the exterior appliance in accordance to the specific relevant information recorded by the information recording means; and state setting means for selectively setting the first and second operation states.

The keyboard apparatus may further comprise a display unit for displaying the specific relevant information between the switch signal and the key code signal formed when the specific key is brought into the key-pushed action.

The key code signal inputting means may include a plurality of numerical keys which are selectively combined to form a plurality of desired key codes.

The key code signal inputting means may include a plurality of keys which are selectively combined to form a plurality of desired key codes.

The state setting means may include a first operation state holding key for allowing the signal processing means to assume the first operation state, and a second operation state holding key for allowing the signal processing means to assume the second operation state.

The information recording means may be operated by the exterior appliance to record therein the specific relevant information between the switch signal and the key code signal.

The joystick and the switch may have respective axis held in coaxial relationship with each other, and the joystick having an upper surface and the switch being resiliently urged to project upwardly of the upper surface of the joystick under the switch-off action.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

One of the preferred embodiments of the keyboard apparatus according to the present invention will be described hereinlater.

Figure 1:
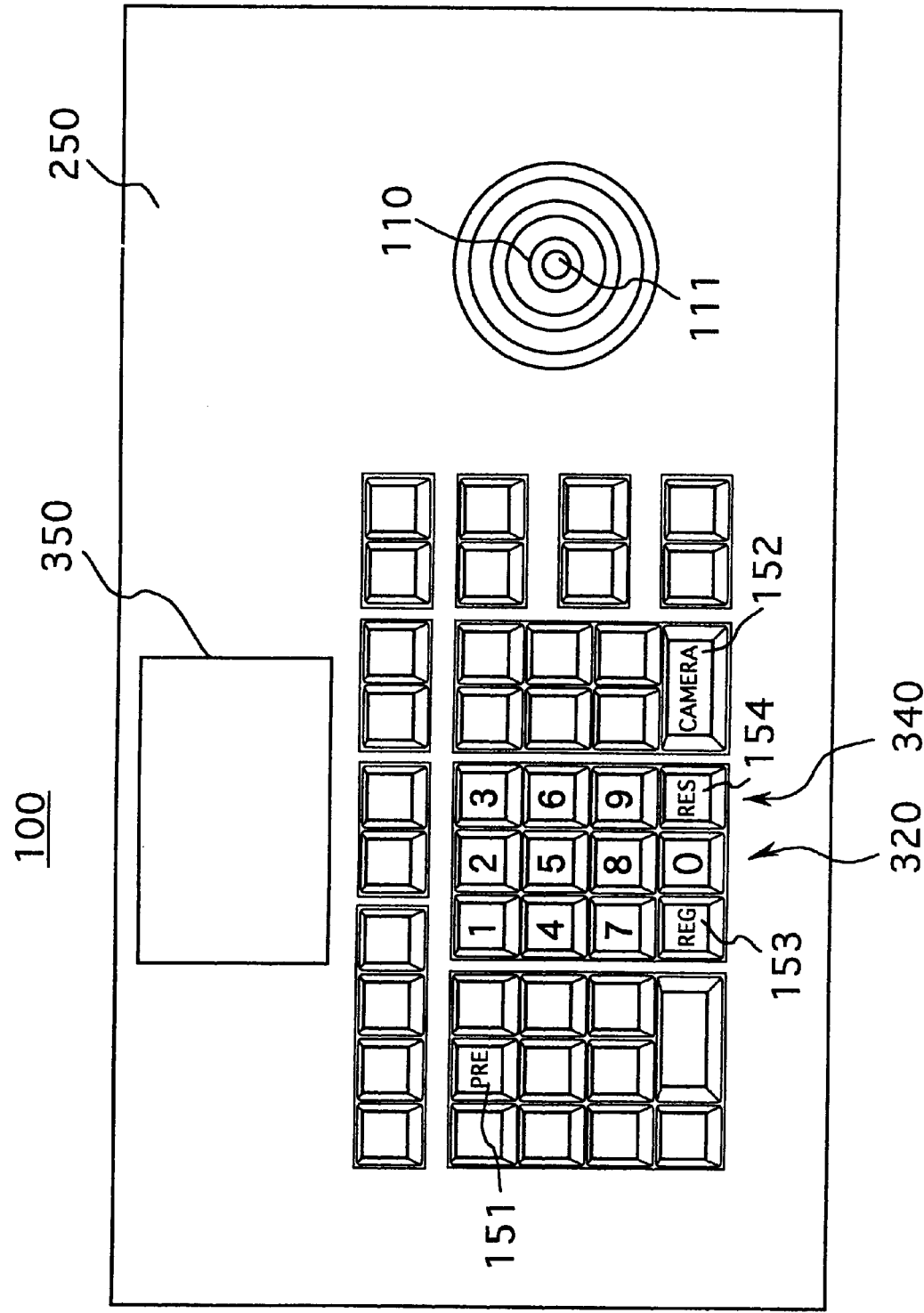
FIG. 1 is a plan view of one preferred embodiment of a keyboard apparatus according to the present invention.
Figure 2:
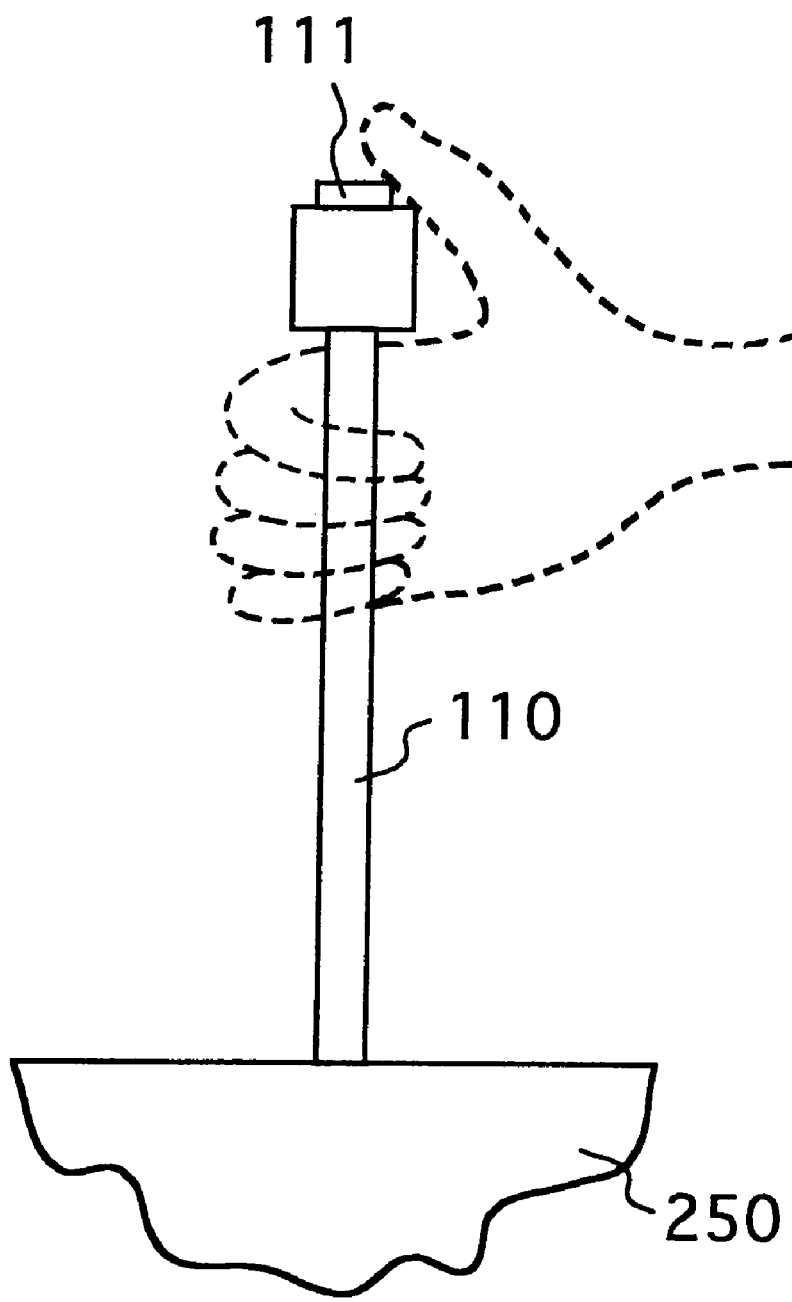
FIG. 2 is a fragmentary side view of a key retainer, a joystick, and a switch forming part of the keyboard apparatus shown in FIG. 1.
Figure 3:
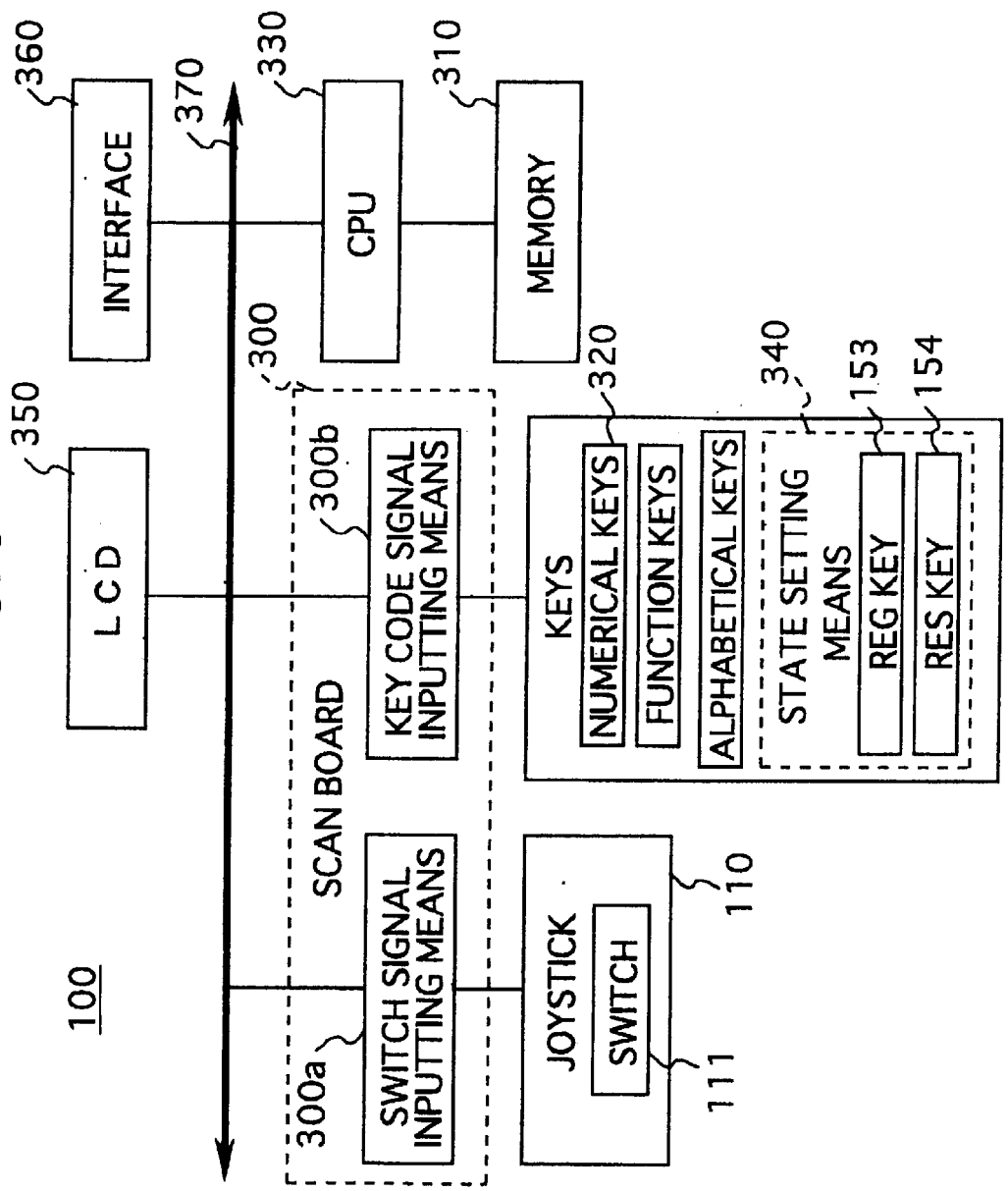
FIG. 3 is a block diagram showing a scan board, a memory, a central processing unit, a liquid crystal display, and an interface forming part of the keyboard apparatus according to the present invention.

Referring now to the drawings, in particular, to FIGS. 1 to 3, there is shown one of the preferred embodiments of the keyboard apparatus according to the present invention. The keyboard apparatus 100 comprises a key retainer 250, and a plurality of keys operatively arranged on the key retainer 250 to perform a key-pushed action and a key-released action. Each of the keys is operative to input a signal indicative of the key-pushed action. The keys includes a plurality of ordinary keys such as for example numerical keys 320 and alphabetical keys, and a plurality of function keys such as for example, a PRE key 151 and a CAMERA key 152, the latter two of which will be described in more detail hereinafter. All the keys have respective key tops each indicated by a specific number or letter as shown in FIG. 1.

The keyboard apparatus 100 further comprises a joystick 110 journally mounted on the key retainer 250 to input a signal indicative of the movement thereof, and a switch 111 operatively supported on the joystick 110 and movable with respect to the joystick 110 to selectively perform a plurality of switching actions consisting of a switch-on action and a switch-off action. The joystick 110 and the switch 111 have respective axis held in coaxial relationship with each other. The joystick 110 has an upper surface, and the switch 111 is resiliently urged to project upwardly of the upper surface of the joystick 110 under the switch-off action. According to the present invention, the joystick 110 may be provided on a retaining member separated from the key retainer 250, but is required to be provided in association with the keys.

The above construction of the joystick 110 and the switch 111 enables an operator to grip the joystick 110 with his or her finger placed on the switch 111 as shown in phantom lines in FIG. 2 to ensure that the joystick 110 is readily moved and inclined in all directions while the switch 111 is pushed by his or her finger. This makes it possible for the operator to operate the joystick 110 and the switch 111 by one hand.

As best shown in FIG. 3, the keyboard apparatus 100 further comprises a scan board 300, a memory 310, a central processing unit 330, hereinafter simply referred to as "CPU", a liquid crystal display 350, hereinafter simply referred to as "LCD", an interface 360, and a bus 370 electrically connected to the scan board 300, the memory 310, the CPU 330, the LCD 350, and an interface 360. The scan board 300, the memory 310, the CPU 330, the LCD 350, and the interface 360 are accommodated in the key retainer 250, while the LCD 350 has a screen having a screen surface flush with the upper surface of the key retainer 250 and is partly housed in the key retainer 250.

The keyboard apparatus 100 further comprises switch signal inputting means 300a and key code signal inputting means 300b which are partly provided in the scan board 300. The switch signal inputting means 300a is designed to input a switch signal indicative of the switch-on action when the switch 111 is operated and moved to perform the switch-on action with respect to the joystick 110. The key code signal inputting means 300b is adapted to input a key code signal indicative of the key-pushed action when each of the keys are operated and moved to perform the key-pushed action. In this embodiment, a plurality of numerical keys 320 are used for forming one of the key codes. For example, the numerical keys 320 "0", "4" and "8" pushed in this order cause a key code "048" to be formed for a key code signal. According to the present invention, any number of numerical keys 320 may be used for forming a key code, and any other key or keys such as alphabetical or function key or keys may replace the numerical key or keys.

The key code signal inputting means 300b is constituted by the part of the scan board 300 and the keys.

The key code signal inputting means 300b may include a plurality of numerical keys 320 which are selectively combined to form a plurality of desired key codes according to the present invention. Also, the key code signal inputting means 300b may replace the numerical keys 320 and thus may include a plurality of ordinary keys other than the numerical keys 320. The ordinary keys can be selectively combined to form a plurality of desired key codes in a similar manner to the numerical keys 320.

The keyboard apparatus 100 further comprises information recording means constituted by the memory 310 which is designed to record specific relevant information between the switch signal inputted from the switch signal inputting means 300a and the key code signal inputted from the key code signal inputting means 300b. The specific relevant information is formed by at least one specific key selected from among the keys and brought into the key-pushed action. The key includes numerical, alphabetical and any other keys the operator wishes to select. According to the present invention, the specific relevant information may be formed by a plurality of specific keys selected from among the keys and brought into the respective key-pushed actions. Further, the keys include numerical, alphabetical and any other keys the operator wishes to select.

The memory 310 is adapted to allow the CPU 330 to record the specific relevant information therein and to read out the specific relevant information into the CPU 330 therefrom.

The keyboard apparatus 100 further comprises signal processing means constituted by the CPU 330 which is operated to receive and process the switch signal from the switch signal inputting means 300a and the key code signal from the key code signal inputting means 300b. The signal processing means, i.e., the CPU 330 is operative to selectively assume two different operation states consisting of a first operation state under which the specific relevant information is recorded by the memory 310 in accordance with the switch signal inputted by the switch signal inputting means 300a and the key code signal inputted by the key code signal inputting means 300b, and a second operation state under which the key code in response to the switch signal from the switch signal inputting means 300a are outputted to the exterior appliance 390 in accordance to the specific relevant information recorded by the memory 310.

The keyboard apparatus 100 further comprises state setting means 340 for selectively setting the first and second operation states of the CPU 330. The state setting means 340 includes a first operation state holding key, such as for example a REG key 153, for allowing the CPU 330 to assume the first operation state, and a second operation state holding key, such as for example a RES key 154, for allowing the CPU 330 to assume the second operation state. The key-pushed actions of the first and second state holding keys 153 and 154 cause the CPU 330 to be operated to hold the first and second operation states, respectively. The state setting means 340 is thus constituted by the CPU 330 and the first and second state holding keys.

The keyboard apparatus 100 further comprises a display unit constituted by the LCD 350 which is operated to display the specific relevant information between the switch signal and the key code signal formed when the specific keys are under the key-pushed actions. The display unit, i.e., the LCD 350 serves to have the operator readily confirm his or her operation conditions of the exterior appliance 390 through the screen of the LCD 350.

The interface 360 is adapted to allow the key code signal in response to the switch signal from the switch signal inputting means 300a to be outputted through a signal transmitting cable 391 to the exterior appliance 390 such as for example watching cameras by the key code signal inputting means 300b in accordance to the specific relevant information recorded by the memory 310.

Figure 7:
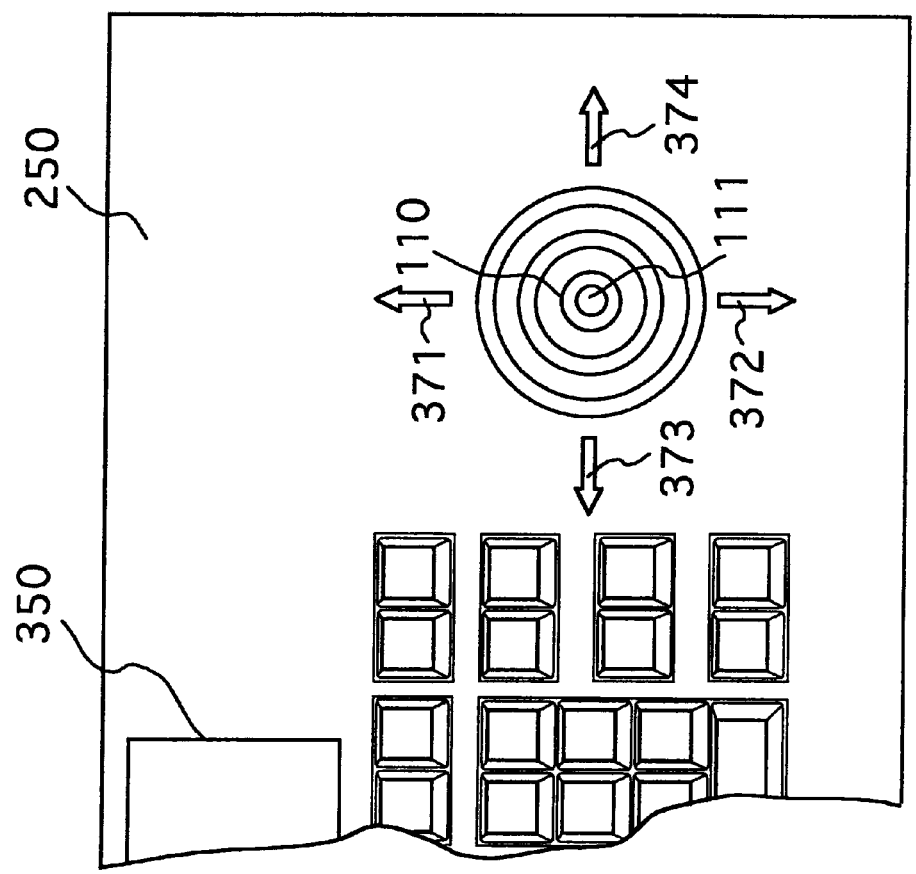
FIG. 7 is a fragmentary enlarged plan view of the keyboard apparatus according to the present invention showing the neighborhood of the joystick.
Figure 8:
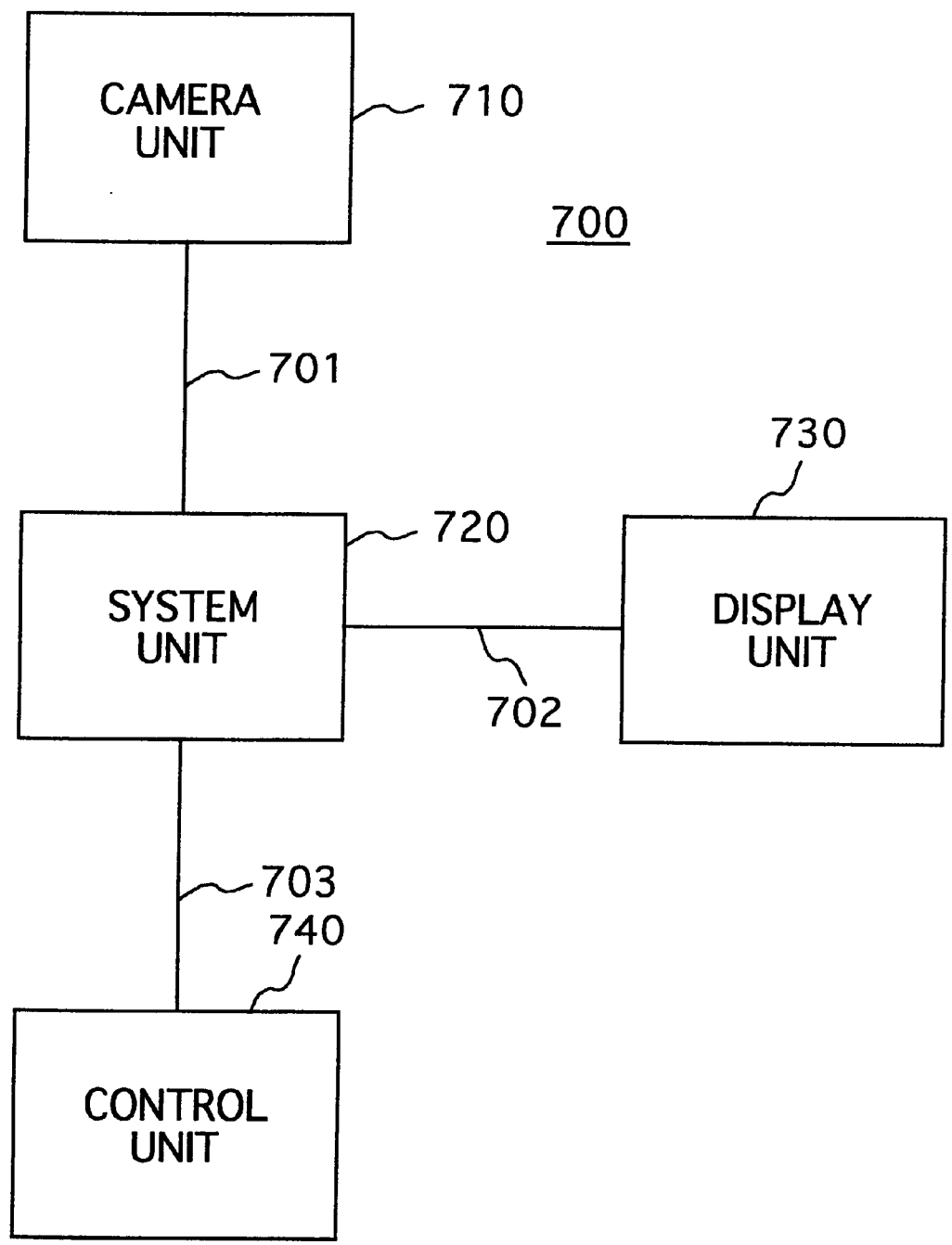
FIG. 8 is a block diagram of one example of a conventional surveillance system.
Figure 9:
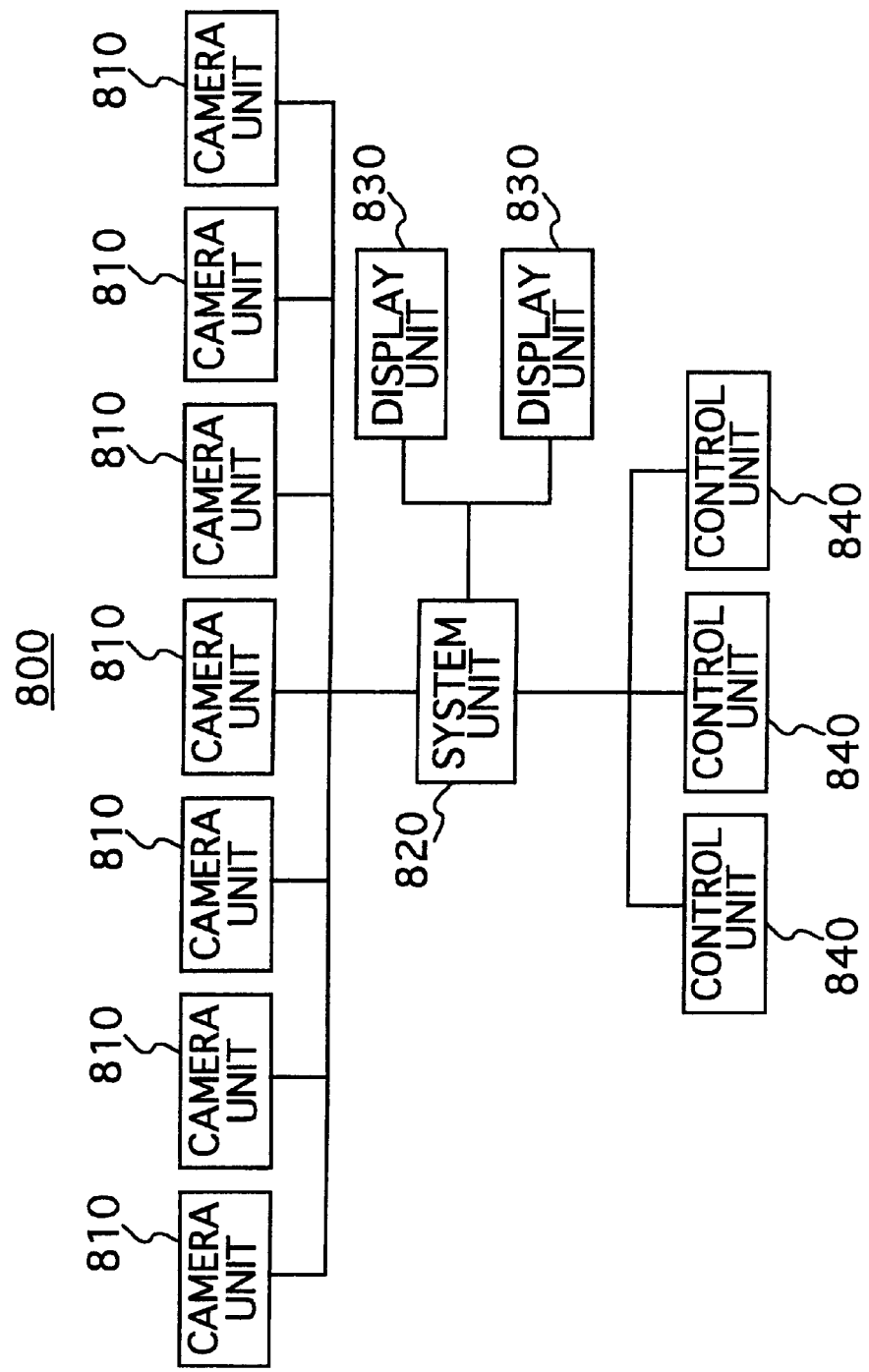
FIG. 9 is a block diagram of another example of the conventional surveillance system.

In FIG. 1, there are shown keys bearing respective key tops for example represented by the letters "REG", "RES", "PRE", "CAMERA" and numbers "0" to "9". However, all the keys other than the above keys have respective key tops having in reality their own letters that are not shown in FIGS. 1 and 7.

The operation of the keyboard apparatus 100 will be described hereinafter with reference to the flowcharts shown in FIGS. 4 and 5.

Figure 4:
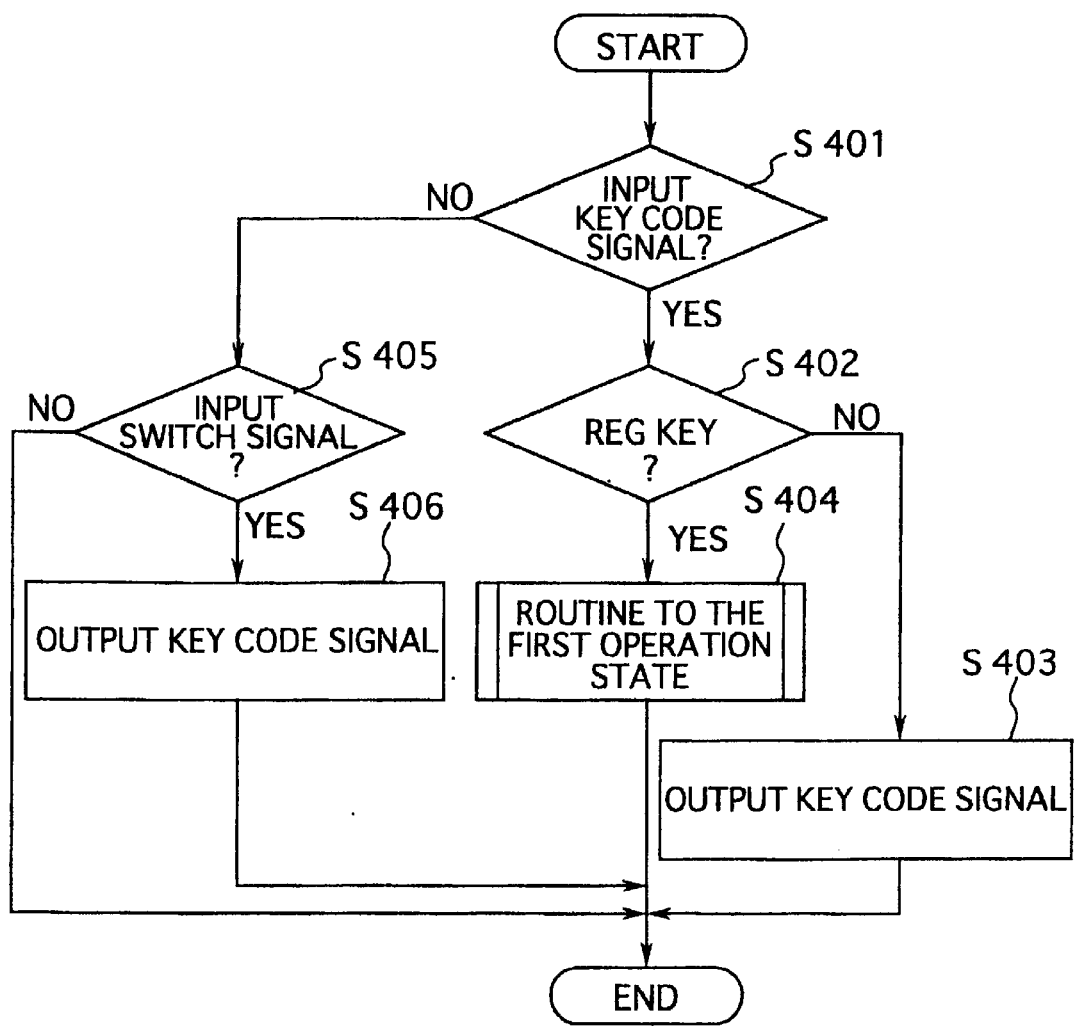
FIG. 4 is a flowchart showing a process performed by the keyboard apparatus according to the present invention.
Figure 5:
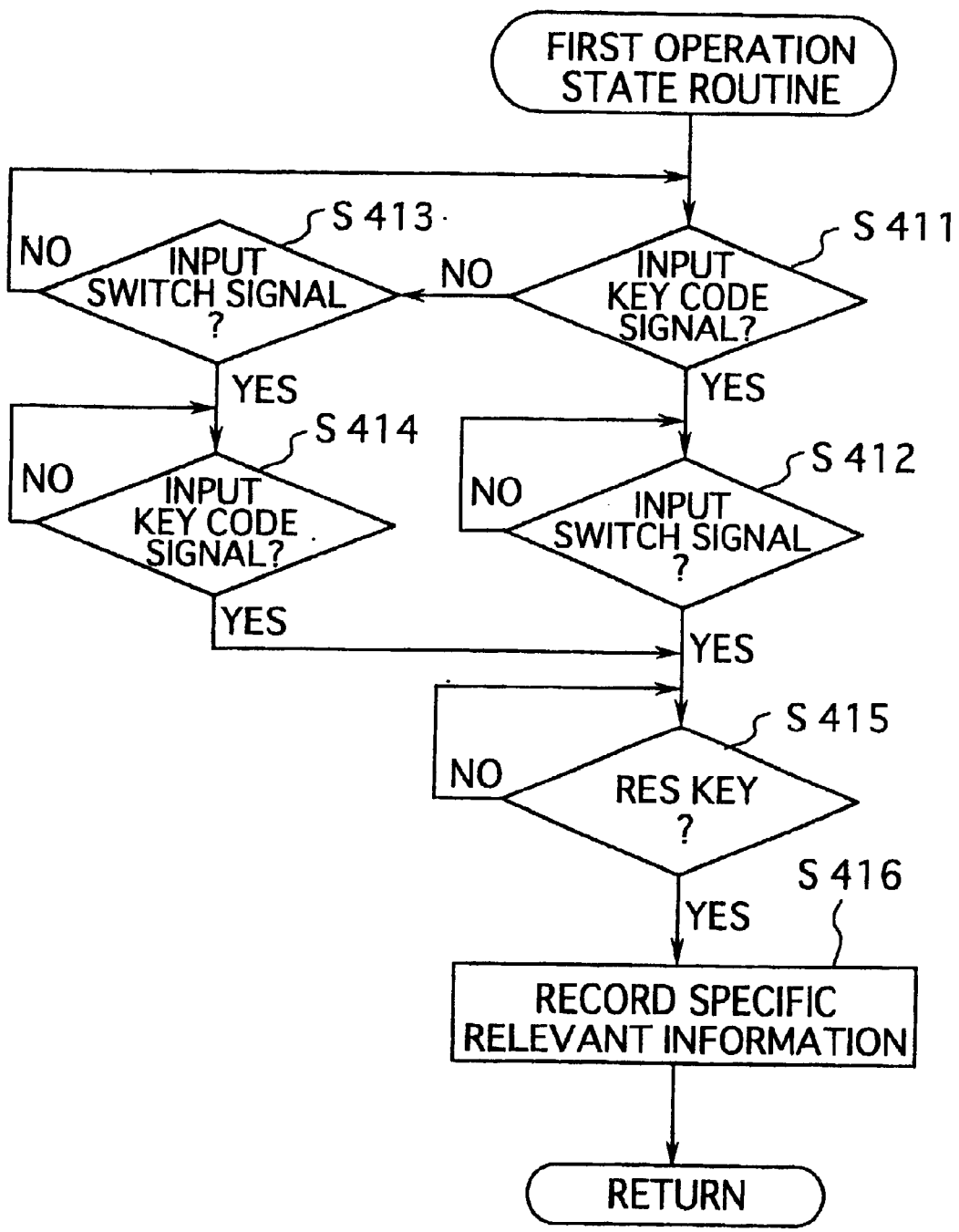
FIG. 5 is a flowchart similar to FIG. 4 but showing a process following the process shown in FIG. 4.
Figure 6:
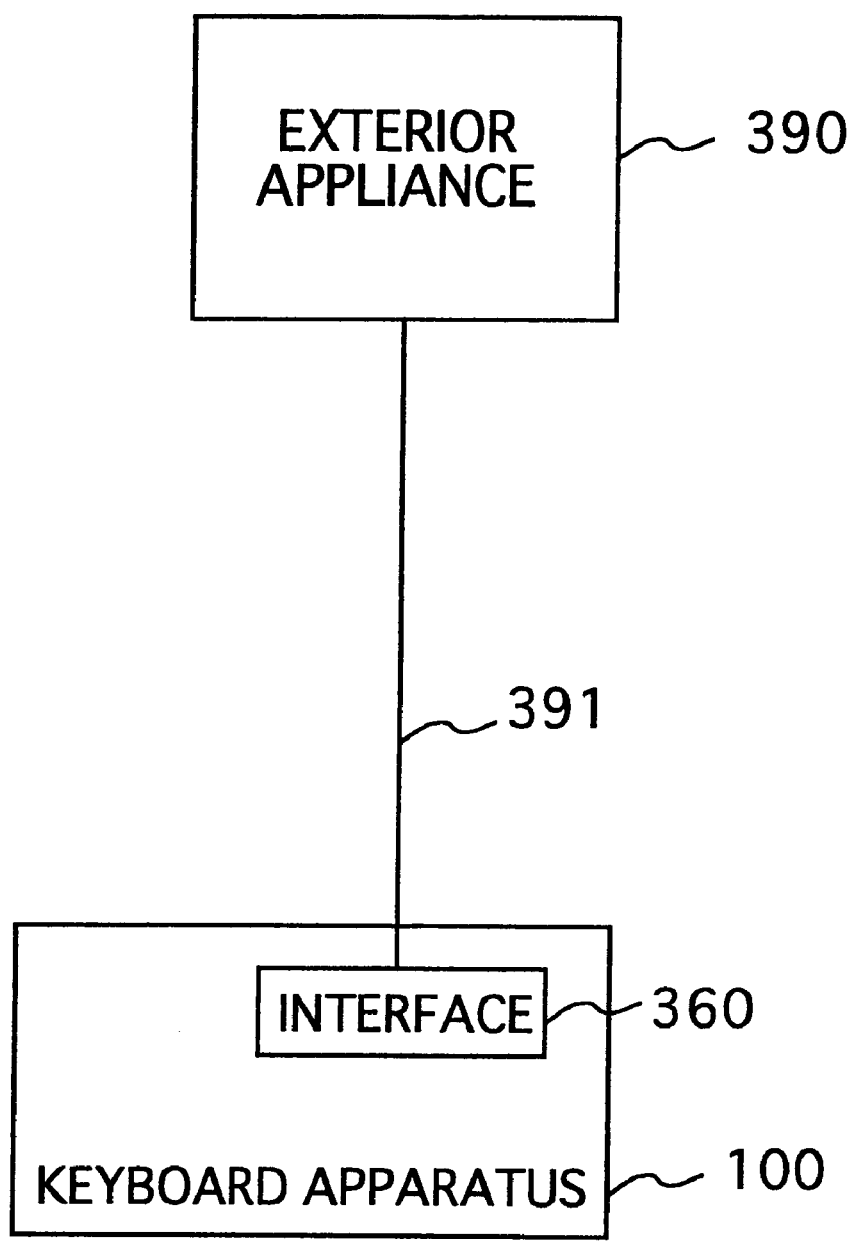
FIG. 6 is a block diagram showing the keyboard apparatus according to the invention and an exterior appliance operatively connected with the keyboard apparatus.

The flowcharts appearing in FIGS. 4 and 5 show steps to be performed by one of the preferred embodiments of the keyboard apparatus 100 according to the present invention, however, the steps according to the present invention are not limited to these steps.

Referring now to FIGS. 1, 3 and 4, the following description is directed to the fact that the keyboard apparatus 100 is operated to have the keys other than the REG key 153 pushed to input the key code signals indicative of the key codes in response to the pushed keys to the exterior appliance 390 through the interface 360. In order to simplify the following description, the PRE key 151 is raised as a key other than the REG key 153 for the operator to operate.

In steps S401 and S405, the CPU 330 is held in a condition to have the key code signal outputted from the CPU 330, and thus under its condition waiting for either the switch signal or the key code signal until any one of the switch signal and the key code signal is inputted into the CPU 330. The steps S401 and S405 are repeated when the switch signals and the key code signals are not inputted into the CPU 330.

When the operator then pushes the PRE key 151, the scan board 300 is operated to output the key code signal indicative of the key-pushed action of the PRE key 151 to the bus 370. The key code signal thus outputted to the bus 370 is then inputted to the CPU 330 through the bus 370. With the key code signal inputted to the CPU 330, the CPU 330 is operated to determine whether the operator pushes the REG key 153 or not in step S402.

When the CPU 330 determines that the operator pushes any key other than the REG key 153, the CPU 330 is operated to output to the bus 370 the key code signal such as for example "001" indicative of the key-pushed action of the PRE key 151 in accordance with the relevant information between the key and key code signal recorded in the memory 310 in step S403. The CPU 330 is again held under its condition waiting for the key code signal after the CPU 330 is operated to output to the bus 370 the key code signal "001" indicative of the key-pushed action of the PRE key 151 in step S401. The key code signal "001" outputted to the bus 370 is inputted into the interface 360 through the bus 370. The interface 360 is then operated to output the key code signal "001" to the exterior appliance 390.

Referring then to FIGS. 1, 3 and 4, the description will then be made about the fact that the keyboard apparatus 100 is operated to output to the exterior appliance 390 through the interface 360 a key code signal indicative of the switch-on action of the switch 111.

In steps S401 and S405, the CPU 330 is held in a condition to have the key code signal outputted from the CPU 330, and thus under its condition waiting for either the switch signal or the key code signal until any one of the switch signal and the key code signal is inputted into the CPU 330. The steps S401 and S405 are repeated when the switch signal and the key code signal are not inputted into the CPU 330.

When the operator then pushes the switch 111, the scan board 300 is operated to output the switch signal indicative of the switch-on action of the switch 111 to the bus 370. The switch signal thus outputted to the bus 370 is then inputted to the CPU 330 through the bus 370.

When the switch signal is then inputted to the CPU 330, the key code signal such as for example "002" indicative of the switch-on action of the switch 111 is outputted to the bus 370 by the CPU 330 in accordance to the specific relevant information recorded by the memory 310 in step S406.

After the key code signal such as for example "002" indicative of the switch-on action of the switch 111 is outputted to the bus 370, the CPU 330 is again held under its condition waiting for the key code signal in step S401. The key code signal "002" outputted to the bus 370 is inputted into the interface 360 through the bus 370. The interface 360 is then operated to output the key code signal "002" to the exterior appliance 390 such as a camera.

Referring then to FIGS. 1, 3, 4 and 5, the description will then be made about the fact that the keyboard apparatus 100 is operated to output to the exterior appliance 390 through the interface 360 a key code signal indicative of the switch-on action of the switch 111 which is to be changed to have another operation command. The following example is directed to the case that the switch 111 is assigned to have an operation command inputted into the CPU 330, the operation command being identical to the operation command generated with the PRE key 151 and the CAMERA key 152 concurrently held in the respective key-pushed actions.

Here, the keyboard apparatus 100 is assumed to be used in combination with a surveillance system which comprises a plurality of watching cameras bearing respective numbers different from each other. The concurrent key-pushed actions of the PRE key 151 and the CAMERA key 152 are performed to produce an image on the screen of the LCD 350 which is identical to the image taken by the camera bearing its number smaller than that of the camera. If the operator can have the switch 111 assigned to have an operation command inputted into the CPU 330, the operation command being identical to the operation command generated with the PRE key 151 and the CAMERA key 152 concurrently held in the respective key-pushed actions, the switch-on action of the switch 111 can produce an image on the screen of the LCD 350 which is identical to the image taken by the camera bearing its number smaller than that of the camera. In this way, the keyboard apparatus 100 can transfer the functions of the PRE key 151 and the CAMERA key 152 to the switch 111 so that the joystick 110 and the switch 111 can readily be operated by one hand. This makes it possible for the operator to operate the joystick 110 to displace the cameras or change the directions of the cameras while concurrently operating the switch 111 to move one camera to other cameras. It is thus to be understood that the keyboard apparatus 100 according to the present invention enables to enhance its operability to a higher level than that of the conventional keyboard apparatus.

The following description is directed to how the keyboard apparatus 100 can transfer the functions of the PRE key 151 and the CAMERA key 152 to the switch 111 to ensure that the joystick 110 and the switch 111 can readily be operated by one hand.

In steps S401 and S405, the CPU 330 is held in a condition to have the key code signal outputted from the CPU 330, and thus under its condition waiting for either the switch signal or the key code signal until any one of the switch signal and the key code signal is inputted into the CPU 330. Therefore, the condition of the CPU 330 includes a second operation state under which the key code signal in response to the switch signal from the switch 111 is outputted to the exterior appliance 390 in accordance to the specific relevant information recorded by the memory 310. The steps S401 and S405 are repeated when the switch signal and the key code signal are not inputted into the CPU 330.

When the operator then pushes the REG key 153, the scan board 300 is operated to output the key code signal indicative of the key-pushed action of the REG key 153 to the bus 370. The key code signal thus outputted to the bus 370 is then inputted to the CPU 330 through the bus 370. With the key code signal inputted to the CPU 330, the CPU 330 is operated to determine whether the operator pushes the REG key 153 or not in step S402.

When the CPU 330 determines that the operator pushes the REG key 153, the CPU 330 is operated to perform a routine to a first operation state in step S404. Under the first operation state, the CPU 330 has the first operation state routine performed while having the second operation state routine stopped. This means that the CPU 330 is held under its condition under which the specific relevant information is recorded by the memory 310 in accordance with the switch signal inputted by the switch signal inputting means 300a and the key code signal inputted by the key code signal inputting means 300b in steps S411 and S413.

In the steps S411 and S413, the condition of the CPU 330 lasts until either the switch signal or the key code signal is inputted into the CPU 330.

For example, the operator operates the numerical keys 320 to input the numbers "003", i.e., the key code "003" with the PRE key 151 and the CAMERA key 152 concurrently pushed by the operator. The key code "003" thus inputted by the operator is outputted to the bus 370 through the scan board 300 in the form of a key code signal indicative of the key-pushed actions of the numerical keys 320. The key code "003" thus outputted to the bus 370 is inputted to the CPU 330. Under these conditions, the CPU 330 is held under its condition waiting for the switch signal from the switch 111 in step S412.

The operator then pushes the switch 111. With the switch 111 pushed by the operator, the scan board 300 is operated to output the switch signal indicative of the switch-on action of the switch 111 to the bus 370. The switch signal indicative of the switch-on action of the switch 111 thus outputted is inputted to the CPU 330 through the bus 370. Under these conditions, the CPU 330 is held under its condition waiting for the key code signal from the RES key 154 in step S415.

When the RES key 154 is then pushed by the operator, the scan board 300 is operated to input the key code signal indicative of the key-pushed action of the RES key 154 to the CPU 330 through the bus 370. In accordance with the switch signal and the key code signal thus inputted to the CPU 330, the CPU 330 is operated to have the specific relevant information between the switch signal of the switch 111 and the key code signal indicative of the key code "003" recorded by the memory 310 in step S416.

With the specific relevant information thus recorded by the memory 310, the CPU 330 is then operated to have the routine of the first operation state return to the starting state. After the routine of the first operation state is returned by the CPU 330 to the starting state, the CPU 330 is operated to end the first operation state of the memory 310, i.e., the information recording means and to resume the second operation state under which the key code signal in response to the switch signal from the switch signal inputting means 300a are outputted to the exterior appliance 390 in accordance to the specific relevant information recorded by the memory 310.

It is to be understood from the previous description that the keyboard apparatus according to the present invention can facilitate to change key code signals, i.e., the contents of the operation commands depending upon the needs by the operator to allow the operator to readily operate the joystick and the switch.

While the above description is directed to the case that the switch signal is inputted to the CPU 330 after the key code signal is inputted to the CPU 330, the key code signal may be inputted to the CPU 330 after the switch signal is inputted to the CPU 330 according to the present invention. In the event that the key code signal is inputted to the CPU 330 after the switch signal is inputted to the CPU 330, the CPU 330 is operated to carry out the steps S413 and S414 in place of the steps S411 and S412.

According to the present invention, the above specific relevant information may include another specific relevant information between the switch signal indicative of the switch-on action of the switch 111 and another key code signal indicative of a key code such as for example a key code "000" which does not work the specific relevant information recorded in the memory 310. In this case, the specific relevant information recorded in the memory 310 to have the switch signal indicative of the switch-on action of the switch 111 and the key code signal indicative of the key code "000" cause the keyboard apparatus 100 to be operated to output through the interface 360 the key code signal indicative of the key code "000" which does not work the specific relevant information recorded in the memory 310. This means that the alternative embodiment is in reality tantamount to a keyboard apparatus which has no switch on the joystick 110.

The fact that the keyboard apparatus 100 according to the present invention comprises a LCD 350 can display the specific relevant information recorded in the memory 310 about the switch signal indicative of the switch 111 and the key code signal indicative of the key code with the predetermined operation by the operator leads to the fact that the operator can confirm through the screen of the LCD 350 the content of the operation command effected by the switch 111 on the joystick 110 to ensure that the content of the operation command is readily and reliably changed by the switch 111 on the joystick 110.

Although the above embodiment is provided with a plurality of numerical keys 320 which are used to have the key code signal inputting means 300b to input a desired key code, any other keys may be used in lieu of the numerical keys 320 according to the present invention as will be seen from the following embodiment.

For example, the alternative embodiment of the keyboard apparatus according to the invention may comprise key code signal inputting means 300b constituted by a LCD 350 and a joystick 110 to ensure that the key code is displayed on the screen of the LCD 350 under the first operation state of the CPU 330 to have the specific relevant information recorded in the memory 310. In this embodiment, the LCD 350 may display numbers constituting a key code in such a manner that the number is increased as the joystick 110 is moved in one direction while the number is decreased as the joystick 110 is moved in the other direction.

The key code signal inputting means 300b forming part of the alternative embodiment ensures that any desired keys pushed by the operator allow the key codes corresponding to the pushed keys to be inputted in the form of a key code signal. This means that the PRE key 151 and the CAMERA key 152 do not need to be concurrently pushed by the operator to input the key code "003" to be outputted to the exterior appliance 390 in steps S411 and S414. This is because of the fact that the operation of inputting the key code "003" is performed only with the pushing actions of the PRE key 151 and the CAMERA key 152. It is thus to be appreciated that the previous alternative embodiment makes it possible for the operator to input any desired key codes while watching the screen of the LCD 350.

While it has been described in the foregoing embodiment that the state setting means 340 includes a REG key 153 retained by the key retainer 250 and forming a first operation state holding key for allowing the CPU 330 to assume the first operation state, and a RES key 154 retained by the key retainer 250 and forming a second operation state holding key for allowing the CPU 330 to assume the second operation state, the keyboard apparatus 100 according to the present invention may be constituted by any other means as long as the state setting means 340 can allow the CPU 330 to assume either the first operation state or the second operation state.

The previous keyboard apparatus 100 according to the present invention does not need such a RES key 154 forming part of the state setting means 340 if the switch signal and the key code signal are concurrently inputted to the CPU 330 to hold the CPU 330 under the first operation state under which the specific relevant information between the switch signal and the key code signal is recorded by the memory 310 in response to the switch signal and the key code signal before the CPU 330 is held under the second operation state under which the key code signal in response to the switch signal are outputted in accordance to the specific relevant information recorded by the memory 310.

The keyboard apparatus 100 according to the present invention may be constituted in combination with the exterior appliance 390 to have the CPU 330 and the memory 310 wherein the CPU 330 is operative to have the specific relevant information between the switch signal and the key code signal recorded by the memory 310 from the exterior appliance 390 and to have the specific relevant information in the memory 310 recorded by the exterior appliance 390. In this way, the foregoing keyboard apparatus 100 ensures that the CPU 330 enables the specific relevant information to be exchanged between the memory 310 and the exterior appliance 390. As a consequence, the specific relevant information recorded by the exterior appliance 390 can readily be transferred to and recorded by the memory 310 for a new keyboard apparatus 100 changed by the old keyboard apparatus 100.

The keyboard apparatus 100 according to the present invention has been described with reference to an example in which the content of the operation command inputted through the switch 111 can be changed by the content of the operation command which is the same as the content of the operation command inputted by the PRE key 151 and the CAMERA key 152 held in their concurrently key-pushed actions, however, the content of the operation command inputted through the switch 111 can freely be changed by the operator according to the present invention.

For example in the case that the keyboard apparatus 100 is used and operated by the operator in combination with a recording and reproducing machine such as a video tape recorder, the joystick 110 can be used for the recording and reproducing machine if the switch 111 is operative to input the operation command changed by the operator so that the joystick 110 is operated to be inclined in any directions while the switch 111 is being held in the switch-on action for the purpose of operating the recording and reproducing machine, although the joystick 110 is usually used to operate the recording and reproducing machine in the manner previously mentioned. More specifically, the keyboard apparatus 100 thus constructed renders it possible for the operator to incline the joystick 110 in the directions as shown by arrows 371, 372, 373 and 374 in FIG. 7 to ensure that the operation commands such as intermittently forwarding, intermittently rewinding, fast-forwarding and rewinding are fed to the recording and reproducing machine.

As will be seen from the foregoing description, it is to be understood that the keyboard apparatus according to the present invention makes it possible for the operator to change into his or her desired content the content of the operation command to be inputted through the switch on the joystick simply by operating the keys on the key retainer. The keyboard apparatus according to the present invention can thus bring about such an advantage that the change of the content of the operation commands to the joystick and the switch is readily changed only by operating the keys on the keyboard and the switch on the joystick. This leads to the fact that there is no need for various kinds of software to be prepared for the conventional apparatus which is used by many operators. It is to be appreciated that the keyboard apparatus according to the present invention does not need complicated management to various kinds of software required for the conventional apparatus and is therefore extremely useful for operators.

While the present invention has thus been shown and described with reference to the specific embodiments, however, it should be noted that the invention is not limited to the details of the illustrated structures but changes and modifications may be made without departing from the scope of the appended claims.

What is claimed is:

1. A keyboard apparatus for controlling and operating at least one exterior appliance, comprising:
   a key retainer,
   a plurality of keys each operatively arranged on said key retainer to perform a key-pushed action and a key-released action, each of said keys being operative to input a signal indicative of said key-pushed action;
   a joystick journally provided in association with said keys to input a signal indicative of said movement thereof;
   a switch operatively supported on said joystick and movable with respect to said joystick to selectively perform a switch-on action and a switch-off action;
   switch signal inputting means for inputting a switch signal indicative of said switch-on action when said switch is operated and moved to perform said switch-on action with respect to said joystick;
   key code signal inputting means for inputting a key code signal indicative of said key-pushed action when each of said keys is operated and moved to perform said key-pushed action;
   information recording means for recording specific relevant information between said switch signal inputted from said switch signal inputting means and said key code signal inputted from said key code signal inputting means, said specific relevant information being formed by at least one specific key selected from among said keys and brought into said key-pushed action;
   signal processing means for receiving and processing said switch signal from said switch signal inputting means and said key code signal from said key code signal inputting means, said signal processing means being operative to selectively assume two different operation states consisting of a first operation state under which said specific relevant information is recorded by said information recording means in accordance with said switch signal inputted by said switch signal inputting means and said key code signal inputted by said key code signal inputting means, and a second operation state under which said key code signal in response to said switch signal from said switch signal inputting means is outputted to said exterior appliance in accordance to said specific relevant information recorded by said information recording means; and
   state setting means for selectively setting said first and second operation states.

2. A keyboard apparatus as set forth in claim 1, which further comprises a display unit for displaying said specific relevant information between said switch signal and said key code signal formed when said specific key is brought into said key-pushed action.

3. A keyboard apparatus as set forth in claim 1 or 2, in which said key code signal inputting means includes a plurality of numerical keys which are selectively combined to form a plurality of desired key codes.

4. A keyboard apparatus as set forth in claim 1 or 2, in which said key code signal inputting means includes a plurality of keys which are selectively combined to form a plurality of desired key codes.

5. A keyboard apparatus as set forth in any one of claims 1 to 4, in which said state setting means includes a first operation state holding key for allowing said signal processing means to assume said first operation state, and a second operation state holding key for allowing said signal processing means to assume said second operation state.

6. A keyboard apparatus as set forth in any one of claims 1 to 5, in which said information recording means is operated by said exterior appliance to record therein said specific relevant information between said switch signal and said key code signal.

7. A keyboard apparatus as set forth in claim 1 or 2, in which said joystick and said switch have respective axis held in coaxial relationship with each other, and said joystick having an upper surface and said switch being resiliently urged to project upwardly of said upper surface of said joystick under said switch-off action.

* * * * *